US009593294B2

United States Patent
Muratore et al.

(10) Patent No.: US 9,593,294 B2
(45) Date of Patent: *Mar. 14, 2017

(54) SENSORY USE OF 6-CYCLOPENTYLIDENEHEXANE DERIVATIVES

(75) Inventors: Agnes Muratore, Chateauneuf (FR); Jean-Jacques Chanot, Speracedes (FR)

(73) Assignee: V. MANE FILS, Bar sur Loup (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/117,675

(22) PCT Filed: May 16, 2012

(86) PCT No.: PCT/FR2012/051113
§ 371 (c)(1),
(2), (4) Date: Nov. 14, 2013

(87) PCT Pub. No.: WO2012/156649
PCT Pub. Date: Nov. 22, 2012

(65) Prior Publication Data
US 2014/0087988 A1     Mar. 27, 2014

(30) Foreign Application Priority Data
May 17, 2011   (FR) ..................... 11 54295

(51) Int. Cl.
*A61K 8/00*     (2006.01)
*C11B 9/00*     (2006.01)

(52) U.S. Cl.
CPC ............ *C11B 9/003* (2013.01); *A23L 27/203* (2016.08)

(58) Field of Classification Search
CPC . A61K 8/33; A61K 8/34; A61Q 13/00; C11B 9/00; A23L 1/03; A23L 1/22
See application file for complete search history.

(56) References Cited

U.S. PATENT DOCUMENTS

| 3,517,031 A | 6/1970 | Beereboo |
| 6,441,052 B1 | 8/2002 | Bajgrowicz et al. |
| 2003/0225142 A1 | 12/2003 | Crooks et al. |

FOREIGN PATENT DOCUMENTS

| EP | 1136481 | 9/2001 |
| GB | 841921 | 7/1960 |

OTHER PUBLICATIONS

Lutz F. Tietze, et al.; Intramolecular Hetero Diels-Alder Reaction of Alkylidene-1, 3-dicarbonyl Compounds. Experimental Evidence for Asymmetric Transition State; Sep. 28, 1987; pp. 499-506.
Jean-Marc Gaudin, et al.; "Structure-Activity Relationship in the Domain of Odorants Having Marine Notes", 2007; vol. 90; pp. 1245-1265.
Michael Zviely, CIC; "Molecule of the Month: Trans-2-Dodecenal"; Nov. 2009; vol. 34; pp. 26-28.
Michael Zviely; "Aroma Chemical Profiles"; May 2009; vol. 34; pp. 18-19.

*Primary Examiner* — John Hardee
(74) *Attorney, Agent, or Firm* — Young & Thompson

(57) ABSTRACT

The invention concerns the use of 6-cyclopentylidenehexane derivatives—6, cyclopentylidenehexan-1-ol and 6-cyclopentylidenehexanal—as sensory agents giving off a fragrance and/or a flavor of interest for a use in perfumery, in cosmetic, in parapharmacy, in detergent industry and in the food industry.

8 Claims, 1 Drawing Sheet

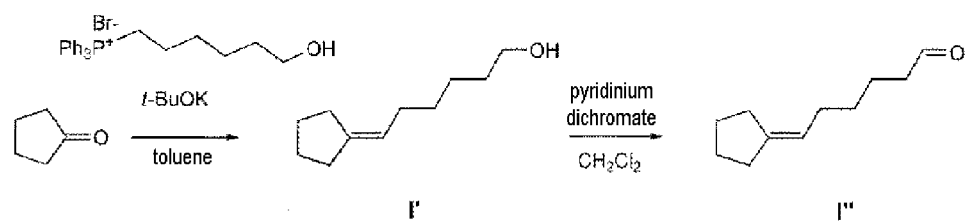

SENSORY USE OF 6-CYCLOPENTYLIDENEHEXANE DERIVATIVES

FIELD OF THE INVENTION

The subject of the present invention is the use of 6-cyclopentylidenehexane derivatives in the chemistry industry and in particular in perfumery, in the cosmetics industry, in parapharmacy, and in the detergents and food industry. More specifically, the invention relates to the use of 6-cyclopentylidenehexan-1-ol and of 6-cyclopentylidenehexanal as sensory or organoleptic agents, such as, for example, fragrancing or olfactory agents or aromatic or gustative agents. The invention is also directed towards compositions and products having sensory or organoleptic properties, in particular gustative and olfactory properties, comprising a 6-cyclopentylidenehexane derivative. Moreover, the present invention also relates to a process for obtaining said 6-cyclopentylidenehexane derivatives.

BACKGROUND OF THE INVENTION

Tietze et al. (Chem. Ber. 121, 499-506, 1988) describe the synthesis and the use of 6-cyclopentylidenehexan-1-ol and 6-cyclopentylidenehexanal as certain reaction intermediates prepared for the purpose of obtaining compounds—cycloadducts and ene-adducts—of which the analysis demonstrates the asymmetrical transition state of the intramolecular hetero Diels-Alder reaction.

US 2003/0225142 describes, moreover, the preparation of 6-cyclopentylidenehexan-1-ol as a synthesis intermediate for nicotinic receptor-inhibiting nicotine antagonists.

Neither Tietze et al. nor US 2003/0225142 mentions sensory properties of 6-cyclopentylidenehexan-1-ol and of 6-cyclopentylidenehexanal. Neither of these documents describes any direct industrial application of these compounds. A fortiori, neither mentions their sensory, organoleptic, aromatic or olfactory properties or their use in perfumery, in the cosmetics industry, in parapharmacy, in the detergents and hygiene and housekeeping products industry or in the food industry.

Geraniol [CAS No. 106-24-1] and citronellol [CAS No. 106-22-9] are among the alcohols most commonly described and used for their flowery, rose, lemon notes. Geraniol is described as flowery, sweet, rosy, lemony; citronellol is flowery, rosy, sweet and lemony.

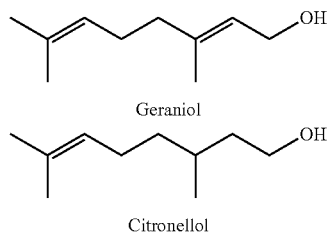

The compounds most well known for their marine, ozonic notes are derivatives of benzodioxepinone type (Helvetica Chimica Acta, 2007, 90, 1245-1265), such as Calone® (Pfizer and Co., United States) or 7-methyl-3,4-dihydro-2H-1,5-benzodioxepin-3-one (U.S. Pat. No. 3,517,031) or else such as Azurone®(Givaudan, Switzerland) or 7-(3-methylbutyl)benzo[B][1,4]dioxepin-3-one (EP1136481). Trans-2-dodecenal is one of the compounds known and very widely used in perfumery, for its aldehyde, orange, fatty note (Perfumer & Flavorist, 2009, 34, 26-28).

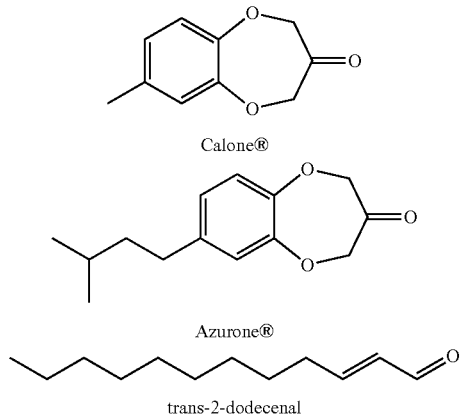

Most of the compounds of the family of odorous aldehydes having aqueous, ozonic perfumes are rather classified in the family of floral notes, said notes predominating. Mention may be made, for example, of 2-methyl-3-(3',4'-methylenedioxyphenyl)propanal (GB841921) or 3-(4-ethylphenyl)-2,2-dimethylpropanal (Perfumer & Flavorist, 2009, 34, 18-19), respectively sold under the trade names Helional® and Floralozone® (International Flavors & Fragrances, United States).

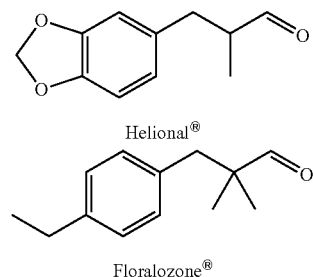

The compounds used repeatedly in aromatic and fragrancing consumer products have an increased allergenic and/or sensitizing nature owing to repeated exposure of users. This is the case in particular of geraniol and citronellol, two of the 26 compounds listed for their allergenic properties within the meaning of European Directive 2003/15/EC which lays down the list of substances which must not form part of cosmetic products except subject to the restrictions and conditions laid down. The notable increase in regulatory or normative requirements passes ever more drastic restrictions onto the flavouring and perfume industry. Consequently, it is important for this industry to have alternative compounds, with sensory, organoleptic, olfactory or gustative characteristics, that are at least comparable, or even increased, and economically viable.

Moreover, the production cost of the known compounds is also tending to become a restriction over which it is important to have better control. Thus, it is for example advisable to limit the number of synthesis steps or else the cost of the raw materials. By way of illustration, the process for synthesising 7-methyl-3,4-dihydro-2H-1,5-benzodioxepin-3-one or Calone® (Pfizer and Co., United States) comprises three steps (U.S. Pat. No. 3,517,031). The starting substrate is pyrocatechol, which is a significantly expensive raw material.

Finally, few known products give off a sufficient sensory power and persistence for use in the perfume and flavouring industry. There are numerous compounds with sensory products that are both qualitatively and quantitatively moderate, which makes it necessary to increase their final content in the composition. Thus, there is a need to identify compounds having such characteristics which are at least comparable if not advantageous.

SUMMARY OF THE INVENTION

The objective of the invention is in particular to overcome these drawbacks by providing 6-cyclopentylidenehexane derivatives of general formula (I) having sensory properties of interest and for which the simplicity with which the reactions are carried out, the low number of steps, the low cost and the availability of the necessary raw materials in large amount, the mild oxygenation and temperature reaction conditions and the supplanting of reagents capable of damaging the health and the sensory properties of the final compounds, represent so many significant advantages for industrial application. One of the additional advantages of the invention is the ease with which the synthesis of the derivatives can be adapted to existing industrial production lines.

Another objective of the invention is to provide compounds with powerful and persistent sensory properties with a view in particular to limiting their final content in ready-to-use olfactory or gustative compositions, and also fragranced compositions or products comprising a compound of formula (I) of which the synthesis has, moreover, the advantage of using reagents that are less expensive and more readily accessible from the viewpoint of processes known in the prior art.

The invention is also directed towards a process for synthesising 6-cyclopentylidenehexan-1-ol (I') in only one step from an economical and common raw material, cyclopentanone. Then, 6-cyclopentylidenehexanal (I") is synthesised in an additional single step by oxidation of the 6-cyclopentylidenehexan-1-ol (I') under mild reaction conditions.

These objectives, and also others which will subsequently emerge, are achieved through the present invention, the subject of which relates to the sensory or organoleptic use of 6-cyclopentylidenehexane derivatives of general formula (I):

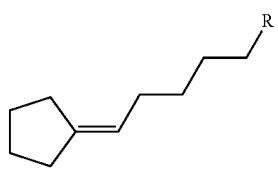

for which R represents a CHO radical or a CH$_2$OH radical.

In other words, the invention relates more particularly to the use of 6-cyclopentylidenehexan-1-ol of formula I' or of 6-cyclopentylidenehexanal of formula I" as a sensory or organoleptic agent.

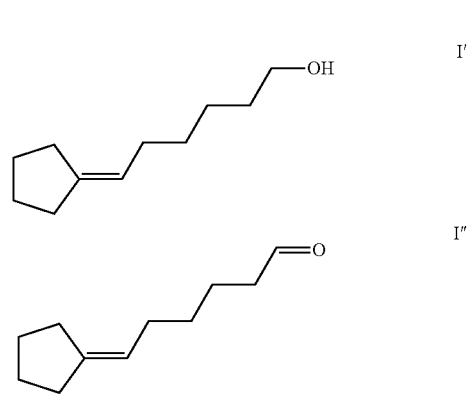

The invention also relates to a method aimed at conferring, modifying, improving or reinforcing the sensory or organoleptic properties of a composition or of an article by adding thereto an effective amount of at least one compound of formula (I).

BRIEF DESCRIPTION OF THE DRAWINGS

FIG. 1 shows the general scheme for synthesis of the 6-cyclopentylidenehexane derivatives of formula (I).

DETAILED DESCRIPTION OF THE INVENTION

According to one particular advantage, the invention also relates to the use of 6-cyclopentylidenehexan-1-ol of formula (I') as a sensory agent or organoleptic agent having a flowery olfactory note, and more particularly having a rose, lemon note, and to the use of 6-cyclopentylidenehexanal of formula (I") as a sensory or organoleptic agent giving off aqueous, aldehyde notes, the olfactory fragrances of which tend towards marine, ozonic, fruity smells.

The term "sensory agent" or "sensory compound" is intended to mean any compound capable of modifying, improving or reinforcing the sensory perception of a substance, of a composition or of an article by a user, and in particular the organoleptic perception. For the purposes of the application, a sensory agent can in particular be an organoleptic agent in that it has an organoleptic property, in particular olfactory or gustative property. Thus, by way of preferential example, the sensory agent according to the invention consists of one of the following organoleptic agents:

a fragrancing agent, capable of conferring, modifying, improving or reinforcing the olfactory perception of a substance, of a composition or of an article; the fragrancing agents also cover odor-masking or odor-neutralizing agents capable of reducing or eliminating the perception of an odor generated by one or more molecules which are part of the composition of a product;

an aromatic agent capable of conferring, modifying, improving or reinforcing the gustative perception of a substance, of a composition or of an article.

Indeed, surprisingly, the Applicant demonstrates that a sensory experience of interest comes from the compounds of formula (I), said sensory experience being of interest in that it is associated with notes that are rare, pleasant and highly sought-after in the field of flavourings and perfumes, and proving, moreover, to be singular, powerful and/or persistent. In the light of the abovementioned prior art products, this singularity is comparable or even advantageous, as attested to by the data in Tables 1 and 2 of Examples 1 and 2. It is notably greater with regard to many other compounds known to those skilled in the art.

Thus, 6-cyclopentylidenehexan-1-ol (I') gives off a very strong and fatty flowery note. More particularly, according to a panel of perfumers, this compound is associated with very powerful rose and lemon smells.

6-Cyclopentylidenehexanal (I") has, for its part, a more aqueous, very strong, diffusive note which has a noteworthy persistence and is described more precisely as being a marine, ozonic, aldehyde, fruity note according to the same panel of perfumers.

These compounds are therefore entirely of interest as an organoleptic, odorous and/or aromatic ingredient, in the perfumery field, the cosmetics industry, parapharmacy, in the detergents and hygiene and housekeeping products industry and in the food industry.

A subject of the present invention is also an organoleptic composition comprising at least one 6-cyclopentylidenehexane derivative of general formula (I), and also a process for modifying the sensory properties of a substance, of a composition or of an article comprising at least one of the following steps: the addition to said substance, said composition or said article, or the application onto said article, of a 6-cyclopentylidenehexane derivative of general formula (I).

Preferentially, the organoleptic composition according to the invention is a fragrancing composition or an aromatic composition.

A subject of the present invention is preferably the use of a compound of formula (I) as a fragrancing agent for conferring, modifying or reinforcing the olfactory properties of a substance, of a composition or of an article, and also the use of a compound of formula (I) as an aromatic agent for conferring, modifying or reinforcing the gustative properties of a substance, of a composition or of an article.

6-Cyclopentylidenehexan-1-ol (I') makes it possible to give a substance, a composition or an article a flowery note with rose and lemon smells.

6-Cyclopentylidenehexanal (I") makes it possible to give a substance, a composition or an article an aqueous, marine, ozonic, aldehyde and fruity note.

The term "organoleptic composition" denotes a mixture comprising at least one organoleptic compound to which one or more ingredient(s) known to those skilled in the art is (are) added, such as a solvent, a solid or liquid support or vehicle, an adjuvant, a fixative, an odorous and/or aromatic compound, etc., which mixture is capable of being used to confer, modify, improve or reinforce the organoleptic, in particular olfactory or gustative, properties of a substance, of a composition or of an article.

By way of nonlimiting example, an organoleptic composition may be a fragrancing composition or an aromatic composition.

Said organoleptic composition may be in the form of a base composition, to be diluted prior to use, or in the form of a ready-to-use final composition. It may be liquid or solid.

The organoleptic composition according to the invention, whether it is a fragrancing or aromatic composition, a base composition or a ready-to-use composition, or liquid or solid, can comprise:

at least one 6-cyclopentylidenehexane derivative of formula (I), at least one support or vehicle known to those skilled in the art as being suitable for this purpose, i.e. organoleptically acceptable, in particular from the viewpoint of its innocuousness and from the viewpoint of its characteristics, and generally relatively neutral from an organoleptic point of view, such as a solvent or an emulsion, optionally, at least one adjuvant known to those skilled in the art, i.e. an ingredient capable of modifying, conferring or increasing an additional characteristic such as the colour, the physicochemical stability or the texture of said composition, and optionally, at least one fragrancing or aromatic co-ingredient known to those skilled in the art.

A subject of the present invention is more particularly a fragrancing composition or an aromatic composition comprising a 6-cyclopentylidenehexane derivative of formula (I).

The term "fragrancing composition" denotes a mixture comprising at least one odorous compound to which one or more ingredient(s) known to those skilled in the art is (are) added, such as a solvent, a solid or liquid support or vehicle, an adjuvant, a fixative, another odorous and/or aromatic compound, etc., which mixture is capable of being used to confer, modify, improve or reinforce the olfactory properties of a substance, of a composition or of an article. For the purpose of the present invention, a fragrancing composition is capable of being used in the perfumery field, the cosmetics field, the parapharmacy field, and in the detergents and hygiene and housekeeping products industry.

The fragrancing composition according to the invention may be in the form of a base composition, to be diluted prior to use, or else in the form of a ready-to-use final composition. It may be liquid or solid.

The acceptable perfume support or vehicle of the fragrancing compositions for household use may be any type of known perfume support or vehicle suitable for this purpose.

In the perfumery, cosmetics, parapharmacy or body hygiene products field, the fragrancing composition according to the invention must be capable of being brought into contact with the various superficial parts of the human body (epidermis, body hair and head hair system, nails, lips and external genital organs) or with the teeth or the oral mucosae, with a view to cleaning them, fragrancing them, modifying the appearance thereof and/or correcting body odours and/or protecting them or keeping them in good condition, as defined by Directive 76/768/EEC.

By way of nonlimiting illustration, mention may be made, as an example of a perfume support or vehicle with a view to a bodily use, of: diethyl phthalate (DEP, CAS 84-66-2) or 2-(2-ethoxyethoxy) ethanol (EMK, CAS 111-90-0). Preferably, the perfume support or vehicle is ethanol (CAS 64-17-5), propylene glycol (PG, CAS 57-55-6), dipropylene glycol (DPG, CAS 110-98-5), isopropyl myristate (IPM, CAS 110-27-0), triethyl citrate (TEC, CAS 77-93-0) or methyl hydrogenated rosinate (CAS 8050-15-5). On the other hand, any substance considered to be carcinogenic, mutagenic or toxic to reproduction and/or classified CMR within the meaning of annex I of Directive 67/548/EEC is among the supports or vehicles excluded from the field of the present invention with a view to bodily use.

The term "aromatic composition" denotes a mixture comprising at least one ingredient acceptable for foods which has aromatic properties according to EC regulation no. 1334/2008, or any other aromatic compound acceptable for foods, to which one or more ingredient(s) known to those skilled in the art is (are) added, such as a solid or liquid support or vehicle, or an adjuvant, which are acceptable for foods, which mixture is capable of being added to food products for the main purpose of conferring a flavour thereon or of modifying the flavour thereof.

Said aromatic composition according to the invention may be in the form of a base composition, to be diluted prior to use, or in the form of a ready-to-use final composition. It may be liquid or solid.

The support or vehicle acceptable for food purposes is in particular chosen so as to dissolve, dilute, disperse or physically modify the 6-cyclopentylidenehexane derivative of formula (I) without modifying its function, in order to facilitate the handling thereof, the application thereof or the use thereof (see also annex I of regulation 1333/2008).

Nonlimiting examples of supports or vehicles acceptable for food purposes are given, for example, in part I of the newly amended annex III of regulation 1333/2008 coming into force in 2011.

Preferentially, said abovementioned support or vehicle is chosen for its innocuousness and its neutral organoleptic characteristics. In particular, it is
  neither methyl tert-butyl ether (MTBE) nor toluene, as regards 6-cyclopentylidenehexan-1-ol (I'),
  nor dichloromethane, as regards 6-cyclopentylidenehexanal (I"),
said methyl tert-butyl ether, toluene and dichloromethane being, moreover, undesirable owing to their toxicity and their non-neutral organoleptic property.

By way of nonlimiting illustration, the organoleptic composition may be incorporated into any formulation known to those skilled in the art, it being possible for said formulation to be, in a nonlimiting manner, a foam, a lotion, an oil, a gel, a cream, a talcum powder, an ointment, an aerosol, an emulsion, or a solvent. The organoleptic composition may, moreover, be encapsulated according to any technique known to those skilled in the art.

The organoleptic composition according to the invention finds its applications in various industrial sectors, including in particular perfumery, cosmetology, body hygiene, household hygiene or else the food industry for modifying, improving or reinforcing a taste, a flavour.

Nonlimiting examples of fragrancing compositions for perfumery include the perfume accords and bases which constitute preferred examples of fragrancing compositions in which the 6-cyclopentylidenehexane derivative of formula (I) can be advantageously used. Perfumes, eaux de parfum, eaux de toilettes, eaux de Cologne, ointments, and aftershave lotions constitute other examples of compositions or of final products in which a 6-cyclopentylidenehexane derivative of formula (I) provides its original note.

Nonlimiting examples of fragrancing compositions for cosmetology include in particular any cosmetic preparation, such as creams, balms, lotions, talcs or powders of any nature, but also a skin lotion, a hair preparation such as a hair colouration or treatment, and any other known support.

A derivative of formula (I) can also be incorporated into any fragrancing compositions for body hygiene, comprising, in a nonlimiting manner, creams, liquid or solid soaps, shower or bath products (shower gel, etc.), or deodorants, whether in the form of sticks or of lotions, shampoos and body-hair or hair products of any type, lacquers, but also body deodorants, or else antiperspirant compositions or antibacterial compositions.

Any fragrancing compositions for household hygiene also constitute examples of compositions or of final products in which the 6-cyclopentylidenehexane derivative of formula (I) provides its original note. This covers in particular air fresheners, detergents, refreshing compounds applied to laundry, cleaning products, solid or liquid detergents, softeners, water for irons, disinfectants, decontaminants, fragranced bleach, fragranced sponges, washing-up liquids, and any other household product.

Examples of compositions into which the compounds of formula (I) can be advantageously introduced are, for example, customary detergent compositions. These compositions generally comprise one or more of the following ingredients: anionic, cationic or amphoteric surfactants, bleaching agents, optical brighteners, various fillers, anti-redeposition agents.

The incorporation of a 6-cyclopentylidenehexane derivative of formula (I) into an aromatic composition for the food industry as a food flavouring is directed towards any type of flavoured products such as milk products, desserts, prepared dishes, soups, or any other food product.

Finally, a derivative of formula (I) can also fragrance articles of textile or paper type and any other material such as wood, sponges, wipes, household linen, kitchen roll, etc., either by direct application of said derivative to the surface of the article or by application of an abovementioned organoleptic composition.

The nature of these various components is not essential and the 6-cyclopentylidenehexane derivative of formula (I) can be added to any type of composition with a view to drawing therefrom a sensory, in particular olfactory or gustative organoleptic, advantage, it being possible for said advantage to be singular and/or powerful and/or persistent, or else to drawing therefrom an economic advantage by virtue of the low production cost and the small amount necessary for a strong impact.

The content of 6-cyclopentylidenehexane derivative of formula (I) of the compositions according to the invention is expressed as percentage by weight or as amount in the final composition under consideration. The effective amount depends (i) on the derivative chosen, (ii) on the nature of said composition (ready-to-use eau de toilette or perfume base, for example), (iii) on the power, (iv) on the persistence of the sensory agent, and (v) on the nature of the desired effect in terms of the final product. It goes without saying that, in a perfume base, the effective amount of 6-cyclopentylidenehexane derivative of formula (I) can vary to a large extent. For example, the content may be greater than 5% and may be at least 90% by weight, whereas in a perfume, an eau de toilette or an aftershave lotion, this effective amount may be very much less than 50% by weight. The organoleptic composition according to the invention may comprise between 0.001% and 10% by weight of the compound of formula (I), in particular between 0.001% and 5% by weight, between 0.005% and 2% or else between 0.01% and 2% by weight of the compound of formula (I).

Thus, the lower limit of the effective amount of 6-cyclopentylidenehexane derivative of formula (I) may be that which causes a perceptible modification to the smell and/or to the taste of the final product. In certain cases, this minimum content may be about 0.001% by weight or about 0.01% by weight.

The effective amount of 6-cyclopentylidenehexane derivative of formula (I) may be in detergent, in particular household, compositions or in soaps at about from 0.001 to 5% by weight, preferably about from 0.01% to 2% by weight.

They may also be involved in fragranced soaps and hair products in a proportion of from 0.005 to 2% by weight.

Use may obviously be made of amounts not included in the limits of the effective amounts indicated above, without however departing from the context of the present invention.

A subject of the invention is also a composition or an article which is fragranced, comprising or else at the surface of which is applied at least one compound of formula (I) according to claim 1 or else an organoleptic composition as defined above.

The present invention is also directed towards a process aimed at modifying the sensory, in particular organoleptic, and more particularly olfactory or gustative, properties of a substance, of a composition or of an article, comprising at least one of the following steps:
- the addition of a compound of formula (I) to said substance, said composition or said article, or
- the application of a compound of formula (I) to the surface of said article.

The compound of formula (I) may be incorporated in this way into any type of composition or article, in particular into the formulations or preparations described above.

One particular subject of the invention lies in the process for preparing a 6-cyclopentylidenehexane derivative of formula (I).

6-Cyclopentylidenehexan-1-ol (I') is obtained in a single step, by Wittig condensation of (6-hydroxyhexyl)triphenylphosphonium bromide, deprotonated using a suitable base such as potassium tert-butoxide, with cyclopentanone, which is a common and inexpensive raw material. The reaction temperature of the abovementioned step is preferably between 10 and 110° C., preferentially between 70 and 90° C., and more preferentially is 70° C.

6-Cyclopentylidenehexanal (I") is obtained under mild reaction conditions, by oxidation, in particular with oxygen in the air, of the 6-cyclopentylidenehexan-1-ol (I') in a single step. Only a small amount of platinum-based catalyst is required. Moreover, any use of reagents which have a definite toxicity and/or are capable of harming the sensory properties of the final compounds, such as dimethyl sulphoxide (DMSO), which, once reduced to dimethyl sulphate (DMS), has a particularly persistent and unpleasant smell of sulphur, is preferably excluded. Furthermore, the catalyst may be recovered and reused for a subsequent reaction for oxidation of I'. The reaction temperature of the abovementioned oxidation step is preferably between 60 and 100° C., preferentially between 70 and 90° C., and more preferentially is 80° C.

Other characteristics and advantages of the invention will emerge more clearly on reading the following description of preferential embodiments, given by way of simple illustrative and nonlimiting examples, and FIG. 1.

The latter shows the general scheme for synthesis of the 6-cyclopentylidenehexane derivatives of formula (I). In a first step, the cyclopentanone undergoes Wittig condensation of (6-hydroxyhexyl)triphenylphosphonium bromide, deprotonated using a suitable base such as potassium tert-butoxide, in a suitable solvent such as toluene. Then, in a second step, the alcohol I' thus obtained is oxidised by oxygen in the air in the presence of a small amount of platinum-based recyclable catalyst, in a suitable solvent such as toluene, so as to give the aldehyde I".

Example 1

Preparation of 6-Cyclopentylidenehexan-1-Ol (I')

By way of nonlimiting example, a particular embodiment of the invention, for obtaining 6-cyclopentylidenehexan-1-ol (I'), is presented hereinafter.

In a round-bottomed flask, one equivalent of (6-hydroxyhexyl)triphenylphosphonium bromide (264.53 g/0.60 mol) and approximately one equivalent of potassium tert-butoxide (70.0 g/0.62 mol) are placed in 550 ml of dry toluene. This suspension is stirred at 70° C. for 2 hours. Approximately one equivalent of cyclopentanone (50.0 g/0.59 mol) diluted in 450 ml of dry toluene is then added very slowly. The mixture is stirred at 70° C. for 5 hours. The reaction medium is left to return to ambient temperature. It is then poured onto 300 ml of a 10% HCl solution. The phases are separated. The organic phase is washed with 200 ml of a saturated aqueous solution of sodium bicarbonate and then with 200 ml of salt water. After drying over magnesium sulphate, filtration on paper and evaporation of the solvent, the crude product is placed in 200 ml of methyl tert-butyl ether (MTBE) in a refrigerator overnight. The precipitate formed is filtered off on a sinter funnel and rinsed with MTBE. The filtrate is concentrated and then the crude product containing the 6-cyclopentylidenehexan-1-ol I' is distilled under reduced pressure: its boiling point is 80° C. under 0.4 torr.

The resulting 6-cyclopentylidenehexan-1-ol (I') has the following spectral characteristics:

1H-NMR (200 MHz, CDCl$_3$): δ (ppm) 1.34-1.38 (m, 4H), 1.57-1.64 (m, 6H), 1.81 (s, 1H), 1.96-1.99 (m, 2H), 2.17-2.22 (m, 4H), 3.63 (t, J=6.4 Hz, 2H), 5.19-5.28 (m, 1H).

13C-NMR (50 MHz, CDCl$_3$): δ (ppm) 25.42, 26.30, 26.38, 28.54, 29.45, 29.49, 32.67, 33.50, 62.88, 119.94, 143.16.

MS [e/m (%)]: 168 (M+, 15), 121 (15), 109 (10), 108 (10), 107 (12), 96 (12), 95 (66), 94 (19), 93 (37), 91 (17), 83 (13), 82 (41), 81 (24), 80 (29), 69 (10), 68 (24), 67 (100), 55 (20), 53 (14), 41 (35), 39 (14).

IR (film, cm$^{-1}$): 853w, 1054w, 1433m, 1450m, 2861m, 2932s, 3320m.

Olfactory evaluation test and comparative olfactory evaluation and power test: The evaluation was carried out blind in individual boxes by a panel of seven evaluators duly trained to give this advice. The evaluation sheet specifies as required the solvent used, which may be, in a nonlimiting manner, dipropylene glycol or food ethanol or any other suitable vehicle. The evaluators have at their disposal the sample to be evaluated, in which they dip a support smelling strip (top smelling strip), and also a bottom smelling strip (dipped in the same sample 24 hours beforehand).

Each evaluator gives an olfactory description in approximately 3 to 6 descriptors for each of the top and bottom smelling strips. The evaluator may, if so desired, name an existing raw material which, in their opinion, most resembles, by virtue of its olfactory properties, the sample evaluated.

In the case of a comparative evaluation, each evaluator must, in addition to the above steps, classify the samples compared according to their power, from the most to the least powerful. This step is also performed blind.

The olfactory descriptors most frequently cited determine the olfactory families and subfamilies of the compound evaluated:
- the most frequent descriptor determines the principal olfactory family,
- the second most frequent descriptor determines the first olfactory subfamily,
- the third most frequent descriptor determines the second subfamily, etc.

The various power classifications are also compiled with a view to determining a final classification. Finally, the impact in formula of the compounds evaluated is organised into a hierarchy according to an overall order of preference.

In the end, each compound evaluated is characterised by approximately three to five descriptors cited in order of importance, an order of magnitude of its olfactory power compared with given compounds, and the impact in formula compared with given compounds.

Table 1 below presents the sensory evaluation of the alcohol I' thus obtained, 6-cyclopentylidenehexan-1-ol, compared with that of geraniol and of citronellol. For the purposes of the evaluation, all the compounds are tested at 10% by weight in dipropylene glycol or food ethanol.

TABLE 1

| Compound | Note | Power | Persistence |
|---|---|---|---|
| 6-cyclopentylidenehexan-1-ol | flowery, rose, geranium, metallic, hesperide | ++ | +++ |
| Geraniol CAS: 106-24-1 | flowery, rose, more lemony, peppery | ++ | +++ |
| Citronellol CAS: 106-22-9 | flowery, rose, more rosy, metallic, sweet | +++ | ++ |

Example 2

Preparation of 6-Cyclopentylidenehexanal (I")

The production of 6-cyclopentylidenehexanal (I") provided hereinafter constitutes another particular embodiment of the invention.

1.25 mol % of platinum (5.8 g of catalyst containing 5% by weight of platinum and 1% by weight of bismuth on carbon/1.49 mmol of platinum) and one equivalent of the alcohol of formula I' (20 g/0.12 mol) are placed in toluene, in the round-bottomed flask. The suspension is stirred vigorously at 80° C. while bubbling air therein overnight. When the conversion of I' is satisfactory, the reaction medium is filtered on a sinter funnel. The platinum-based catalyst is recovered on the sinter funnel so as to be reused, such as in a subsequent reaction for oxidation of I'. The filtrate containing the 6-cyclopentylidenehexanal I" is concentrated and then distilled under reduced pressure: its boiling point is 59° C. under 0.2 torr.

The resulting 6-cyclopentylidenehexanal (I") has the following spectral characteristics:

1H-NMR (200 MHz, CDCl$_3$): δ (ppm) 1.30-1.46 (m, 2H), 1.55-1.72 (m, 6H), 1.94-2.04 (m, 2H), 2.12-2.24 (m, 4H), 2.43 (td, J=7.0 Hz and J=1.8 Hz, 2H), 5.17-5.26 (m, 1H), 9.76 (t, J=1.8 Hz, 1H).

13C-NMR (50 MHz, CDCl$_3$): δ (ppm) 21.72, 26.29, 26.36, 28.58, 29.13, 29.20, 33.51, 43.81, 119.35, 143.64, 202.82.

MS [e/m (%)]: 166 (M+, 2), 148 (50), 119 (18), 107 (13), 97 (10), 95 (69), 94 (12), 93 (38), 91 (23), 82 (13), 81 (29), 80 (39), 79 (48), 77 (21), 68 (15), 67 (100), 65 (14), 55 (21), 53 (16), 41 (46), 39 (27).

IR (film, cm$^{-1}$): 851w, 1390w, 1451w, 1724s, 2715w, 2845m, 2936s.

Table 2 below presents the sensory evaluation of the aldehyde (I"): 6-cyclopentylidenehexanal, compared with that of Calone® and of trans-2-dodecenal. The compounds are tested at 1% by weight in dipropylene glycol. The evaluation was carried out blind by a panel of seven evaluators according to the same recommendations given in Example 1.

TABLE 2

| Compound | Note | Power | Persistence |
|---|---|---|---|
| 6-cyclopentylidenehexanal | aldehyde, aqueous, melon, ozonic, marine | ++++ | +++ |

TABLE 2-continued

| Compound | Note | Power | Persistence |
|---|---|---|---|
| Calone ® or 7-methyl-3,4-dihydro-2H-1,5-benzodioxepin-3-one (Pfizer and Co., United States) | marine, salty, sea spray | ++ | +++ |
| Trans-2-dodecenal | aldehyde, mandarin, coriander, fatty | +++ | ++ |

Example 3

Fragrancing Composition C Incorporating the 6-Cyclopentylidenehexanal (I") Obtained According to Example 2

The test for a comparative olfactory evaluation extended to the study of the impact of the given compounds in various formulae is carried out as follows. The same formula or accord is prepared, firstly, without any starting material which is part of the compounds under comparison, and secondly, separately with each of the raw materials compared, in an amount suitable for its olfactory power. In order to determine an order of preference of the impact of the compounds compared in the same formula, the formulae or accords thus prepared are in turn the subject of a blind comparative evaluation.

The following three accords were prepared: a tamarind accord A, then the same tamarind accord A comprising, in addition, trans-2-dodecenal so as to give the accord B, and finally, the same tamarind accord A comprising the 6-cyclopentylidenehexanal (I") so as to give the accord C. Their formulations are described below and are used as fragrancing bases: they are incorporated at 1% by weight into a ready-to-use shower gel.

| Ingredients | Accord A | Accord B | Accord C |
|---|---|---|---|
| ALDEHYDE C08 | 0.05 | 0.05 | 0.05 |
| LINALOL | 7.40 | 7.40 | 7.40 |
| LIMONENE | 28.00 | 28.00 | 28.00 |
| OXANE or 2-methyl-4-propyl-1,3-oxathiane (Firmenich, Switzerland) | 0.70 | 0.70 | 0.70 |
| PARA-CYMENE | 10.00 | 10.00 | 10.00 |
| THYMOL | 0.90 | 0.90 | 0.90 |
| LAURIC ALDEHYDE C12 | 0.15 | 0.15 | 0.15 |
| 1,3,5-UNDECATRIENE | 0.20 | 0.20 | 0.20 |
| METHYL METHYL ANTHRANILATE | 10.00 | 10.00 | 10.00 |
| DIPROPYLENE GLYCOL | 42.60 | 41.70 | 42.51 |
| TRANS-2-DODECENAL | 0.00 | 0.90 | 0.00 |
| 6-cyclopentylidenehexanal (I") | 0.00 | 0.00 | 0.09 |

The comparative evaluation of the accords A, B and C at 1% by weight in a shower gel base shows that the addition of trans-2-dodecenal in an amount of 0.9%, to the accord B, introduces bitterness at the top, but its impact falls away in the heart. The addition of 6-cyclopentylidenehexanal (I") in an amount of only 0.09% to the accord C introduces a more aldehydic, metallic, aqueous facet compared with the accords A and B.

Example 4

Fragrancing Composition F Including the 6-Cyclopentylidenehexanal (I") Obtained According to Example 2

The comparative olfactory evaluation extended to the study of the impact of the given compounds in formulae is carried out according to the test described in Example 3.

Eaux de toilette for women were prepared by incorporating 10% by weight of the three fragrancing formulae described below, one of which contains the 6-cyclopentylidenehexanal (I") and one of which contains Calone®:

| Ingredients | Accord D | Accord E | Accord F |
|---|---|---|---|
| GAMMA NONALACTONE | 0.05 | 0.05 | 0.05 |
| LEMON ESSENCE | 2.00 | 2.00 | 2.00 |
| BERGAMOT ESSENCE | 2.00 | 2.00 | 2.00 |
| COUMARIN | 0.30 | 0.30 | 0.30 |
| MUSK T ® or ethylene brassylate (Takasago, Japan) | 5.00 | 5.00 | 5.00 |
| BENZYL SALICYLATE | 18.00 | 18.00 | 18.00 |
| CIS-3-HEXENYL SALICYLATE | 3.00 | 3.00 | 3.00 |
| METHYL DIHYDROJASMONATE | 20.00 | 20.00 | 20.00 |
| VANILLIN | 0.50 | 0.50 | 0.50 |
| GALAXOLIDE ® or 1,3,4,6,7,8-hexahydro-4,6,6,7,8,8-hexamethylcyclopenta-(g)-2-benzopyran (IFF, United States) | 20.00 | 20.00 | 20.00 |
| YLANG ESSENCE | 1.50 | 1.50 | 1.50 |
| METHYL ANTHRANILATE | 0.10 | 0.10 | 0.10 |
| DIPROPYLENE GLYCOL | 27.55 | 25.55 | 27.35 |
| CALONE ® or 7-methyl-3,4-dihydro-2H-1,5-benzodioxepin-3-one (Pfizer and Co., United States) | 0.00 | 2.00 | 0.00 |
| 6-cyclopentylidenehexanal (I") | 0.00 | 0.00 | 0.20 |

Comparative evaluation of the accords D, E and F at 10% by weight in an alcoholic base: the addition of 2% of Calone® to the accord E introduces a marine facet. The addition of only 0.2% of 6-cyclopentylidenehexanal (I") to the accord F introduces a very aqueous, aldehydic, metallic facet compared with the accord D. The impact of 6-cyclopentylidenehexanal (I") is still notable after four days.

Example 5

Fragrancing Compositions H and I Incorporating a 6-Cyclopentylidenehexane Derivative Obtained According to Examples 1 and 2

The comparative olfactory evaluation extended to the study of the impact of the given compounds in formulae is carried out according to the test described in Example 3.

A lily of the valley-pear accord G, then the same accord comprising the 6-cyclopentylidenehexanal (I") so as to give the accord H, then the same accord comprising the 6-cyclopentylidenehexan-1-ol (I') so as to give the accord I, the formulations of which are described below, are used as fragrancing bases: they are prepared and then incorporated at 1% by weight into a ready-to-use softener:

| Ingredients | Accord G | Accord H | Accord I |
|---|---|---|---|
| HEXYL ACETATE | 1.10 | 1.10 | 1.10 |
| DIHYDROMYRCENOL ® or 2,6-dimethyl-7-octen-2-ol (IFF, United States) | 0.20 | 0.20 | 0.20 |
| PHENYLETHYL ALCOHOL | 22.20 | 22.20 | 22.20 |
| LINALOL | 6.70 | 6.70 | 6.70 |
| BENZYL ACETATE | 2.20 | 2.20 | 2.20 |
| STYRALLYL ACETATE | 0.20 | 0.20 | 0.20 |
| FRESKOMENTHONE | 0.30 | 0.30 | 0.30 |
| DIMETHYLBENZYL ACETATE CARBINOL | 0.10 | 0.10 | 0.10 |
| CYCLAMEN ALDEHYDE | 3.30 | 3.30 | 3.30 |
| LILIAL ® or para-tert-butyl-alpha-methylhydrocinnamaldehyde (Givaudan, Switzerland) | 11.00 | 11.00 | 11.00 |
| ALDEHYDE C14 | 0.70 | 0.70 | 0.70 |
| METHYL DIHYDROJASMONATE | 4.50 | 4.50 | 4.50 |
| CITRONELLOL | 13.50 | 13.50 | 13.50 |
| TERPINEOL | 2.20 | 2.20 | 2.20 |
| HELIOTROPINE | 0.80 | 0.80 | 0.80 |
| GALAXOLIDE ® or 1,3,4,6,7,8-hexahydro-4,6,6,7,8,8-hexamethylcyclopenta-(g)-2-benzopyran (IFF, United States) | 5.50 | 5.50 | 5.50 |
| PHENOXANOL ® or 3-methyl-5-phenylpentan-1-ol (IFF, United States) | 1.70 | 1.70 | 1.70 |
| CINNAMIC ALDEHYDE | 0.20 | 0.20 | 0.20 |
| HEXYL CINNAMIC ALDEHYDE | 3.30 | 3.30 | 3.30 |
| TRIPLAL ® or 2,4-dimethyl-3-cyclohexen-1-carbaldehyde (IFF, United States) | 0.60 | 0.60 | 0.60 |
| METHYL ANTHRANILATE | 0.10 | 0.10 | 0.10 |
| DIPROPYLENE GLYCOL | 19.60 | 18.50 | 18.50 |
| 6-cyclopentylidenehexanal (I") | 0.00 | 1.10 | 0.00 |
| 6-cyclopentylidenehexan-1-ol (I') | 0.00 | 0.00 | 1.10 |

Comparative evaluation of the accords G, H and I at 1% by weight in a softener base shows that the addition of 6-cyclopentylidenehexanal (I") in a softener base to the accord H very notably accentuates the aldehydic, aqueous facet compared with the accord G, and that the addition of 6-cyclopentylidenehexan-1-ol (I') in a softener base to the accord I also accentuates the aqueous facet and also the flowery note and gives power to the whole compared with the accord G.

Example 6

Fragrancing Composition K Incorporating the 6-Cyclopentylidenehexan-1-Ol (I') Obtained According to Example 1

The comparative olfactory evaluation extended to the study of the impact of the given compounds in formulae is carried out according to the test described in Example 3.

A lily of the valley accord J, then the same accord comprising the 6-cyclopentylidenehexan-1-ol (I') so as to give the accord K, the formulations of which are described below, are used as fragrancing bases: they are prepared and then incorporated at 10% by weight into a ready-to-use eau de toilette:

| Ingredients | Accord J | Accord K |
|---|---|---|
| PHENYLETHYL ALCOHOL | 37 | 37 |
| BENZYL SALICYLATE | 38 | 38 |
| HEXYL CINNAMIC ALDEHYDE | 19 | 19 |
| LYRAL ® or 4-(4-hydroxy-4-methylpentyl)-3-cyclohexene-1-carboxaldehyde (IFF, United States) | 5 | 5 |
| DIPROPYLENE GLYCOL | 1 | 0 |
| 6-cyclopentylidenehexan-1-ol (I') | 0 | 1 |

The comparative evaluation of the accords J and K at 10% by weight in an alcoholic base shows that the addition of the 6-cyclopentylidenehexan-1-ol (I') to the accord K accentuates the flowery and lily of the valley notes and, compared with the accord J, it gives the note a natural facet.

Example 7

Fragrancing Composition M Incorporating the 6-Cyclopentylidenehexan-1-Ol (I') Obtained According to Example 1

The comparative olfactory evaluation extended to the study of the impact of the given compounds in formulae is carried out according to the test described in Example 3.

A "water melon-white flowers" accord L, then the same accord comprising the 6-cyclopentylidenehexan-1-ol (I') so as to give the accord M, the formulations of which are described below, are used as fragrancing bases: they are prepared and then incorporated at 1% by weight into a ready-to-use air freshener:

| Ingredients | Accord L | Accord M |
|---|---|---|
| ABRAC OSYROL | 4.00 | 4.00 |
| BACDANOL ® or 4-(2,2,3-trimethyl-3-cyclopentyl)-2-ethyl-3-buten-1-ol (IFF, United States) | 1.00 | 1.00 |
| PHENYLETHL ALCOHOL | 3.00 | 3.00 |
| BOURGEONAL ® or 4-(1,1-dimethylethyl)benzene-propanal (Givaudan, Switzerland) | 0.20 | 0.20 |
| CALONE ® or 7-methyl-3,4-dihydro-2H-1,5-benzodioxepin-3-one (Pfizer and Co., United States) | 0.10 | 0.10 |
| CANTHOXAL ® or 2-methyl-3-(para-methoxyphenyl)propanal (IFF, United States) | 0.20 | 0.20 |
| FOAM SUBSTANCE | 0.20 | 0.20 |
| CYCLOGALBANATE ® or 2-propenyl cyclohexyloxyacetate (Symrise, Germany) | 0.10 | 0.10 |
| HYDROXYCITRONELLAL | 1.00 | 1.00 |
| HEXYLCINNAMALDEHYDE | 2.00 | 2.00 |
| LYRAL ® or 4-(4-hydroxy-4-methylpentyl)-3-cyclohexene-1-carboxaldehyde (IFF, United States) | 22.00 | 22.00 |
| ISOPAR L | 9.00 | 9.00 |
| METHYL DIHYDROJASMONATE | 14.00 | 14.00 |
| ALPHA-ISOMETHYL IONONE | 6.20 | 6.20 |
| MUSK T ® or ethylene brassylate (Takasago, Japan) | 5.00 | 5.00 |
| HELIONAL ® or 2-methyl-3-(3',4'-methylene-dioxyphenyl)propanal (IFF, United States) | 3.00 | 3.00 |
| GALAXOLIDE ® or 1,3,4,6,7,8-hexahydro-4,6,6,7,8,8-hexamethylcyclopenta-(g)-2-benzopyran (IFF, United States) | 6.00 | 6.00 |
| OCTAHYDROTETRAMETHYL ACETONAPHTHONE | 3.00 | 3.00 |
| CYCLOPENTADECANOLIDE | 4.00 | 4.00 |
| SANDELA ® or 3-(2,2,3-trimethylnorboman-5-yl)-cyclohexan-1-ol (Givaudan, Switzerland) | 6.00 | 6.00 |
| DIPROPYLENE GLYCOL | 10.00 | 9.90 |
| 6-cyclopentylidenehexan-1-ol (I') | 0.00 | 0.10 |

The comparative evaluation of the accords L and M at 1% by weight in an air freshener shows that the addition of the 6-cyclopentylidenehexan-1-ol (I') to the accord M accentuates the jute, aqueous facet and gives the note power compared with the accord L.

The invention claimed is:

1. An organoleptic composition comprising:
   a 6-cyclopentylidenehexane derivative of formula (I)

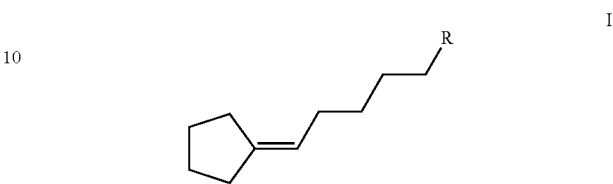

in which R represents a CHO,
   an innocuous and organoleptically acceptable support in which the 6-cyclopentylidenehexane derivative of formula (I) is dissolved, diluted or dispersed, wherein the support is a solvent or an emulsion,
   optionally, an adjuvant, and
   optionally, a fragrancing or aromatic co-ingredient,
   wherein carcinogenic substances, a mutagenic substances or a substances toxic to reproduction are excluded as supports or vehicles in the composition.

2. The organoleptic composition according to claim 1, comprising at least 0.001% by weight of a compound of formula (I).

3. The organoleptic composition according to claim 1, comprising between 0.001% and 10% by weight of a compound of formula (I).

4. The organoleptic composition according to claim 1, wherein the support is a solvent selected from the group consisting of ethanol, propylene glycol, dipropylene glycol, isopropyl myristate, triethyl citrate and methyl hydrogenated rosinate.

5. A method for giving to a substance, a composition or an article an aqueous, marine, ozonic, aldehyde and fruity note, said method comprising at least one of the following steps:
   adding the organoleptic composition as defined in claim 1 to said substance, to said composition or to said article, or
   applying the organoleptic composition as defined in claim 1 to the surface of said article.

6. The method according to claim 5, for conferring, modifying or reinforcing the olfactory properties of said substance, said composition or said article.

7. The method to claim 6, for neutralizing or masking the odor of said substance, said composition or said article.

8. The method according to claim 5, for conferring, modifying or reinforcing the gustative properties of said substance, said composition or said article.

* * * * *